(12) United States Patent
Riedner et al.

(10) Patent No.: US 6,245,184 B1
(45) Date of Patent: Jun. 12, 2001

(54) METHOD OF FABRICATING SCINTILLATORS FOR COMPUTED TOMOGRAPH SYSTEM

(75) Inventors: Robert J. Riedner, Waukesha; Matthew Schedler, Whitefish Bay, both of WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 08/977,441

(22) Filed: Nov. 26, 1997

(51) Int. Cl.[7] ........................................... B32B 31/18
(52) U.S. Cl. ..................... 156/247; 156/250; 156/259; 156/344; 250/361 R
(58) Field of Search ........................... 156/259, 250, 156/299, 246, 247, 264, 344; 250/361 R

(56) References Cited

U.S. PATENT DOCUMENTS

| | | |
|---|---|---|
| 3,041,228 | 6/1962 | MacLeod . |
| 4,353,957 * | 10/1982 | Rutt et al. ........................ 428/292 |
| 4,533,489 | 8/1985 | Utts et al. . |
| 4,615,583 | 10/1986 | Tsuno et al. . |
| 5,059,800 | 10/1991 | Cueman et al. . |
| 5,227,633 * | 7/1993 | Ryuo et al. . |
| 5,378,894 | 1/1995 | Akai . |
| 5,831,269 | 11/1998 | Nakamura et al. . |
| 5,866,908 | 2/1999 | Novak . |

* cited by examiner

Primary Examiner—Sam Chuan Yao
(74) Attorney, Agent, or Firm—Armstrong Teasdale LLP; Christian G. Cabou

(57) ABSTRACT

A method of fabricating scintillators using a inside diameter saw is described. The inner diameter saw includes a blade having a diamond coated inner circumference cutting edge. In one embodiment, a plurality of scintillators are stacked and cut with the ID saw to form a plurality of first bars. The first bars are placed in a fixture creating a gap which is filled with a cast reflector material. The first bars are then cut with the ID saw at a 90 degree angle to the pieces creating second bars. The second bars are placed in a fixture and spaced to create second gaps similar to the first gaps. The second gaps are filled similar to the first gaps with a cast reflector material forming scintillator array. The described method minimizes the number of handling operations, therefore saving time.

11 Claims, 3 Drawing Sheets

METHOD OF FABRICATING SCINTILLATORS FOR COMPUTED TOMOGRAPH SYSTEM

FIELD OF THE INVENTION

This invention relates generally to computed tomograph (CT) imaging and, more particularly, to detectors utilized in connection with CT systems.

BACKGROUND OF THE INVENTION

In at least some computed tomograph (CT) imaging system configurations, an x-ray source projects a fan-shaped beam which is collimated to lie within an X-Y plane of a Cartesian coordinate system and generally referred to as the "imaging plane". The x-ray beam passes through the object being imaged, such as a patient. The beam, after being attenuated by the object, impinges upon an array of radiation detectors. The intensity of the attenuated beam radiation received at the detector array is dependent upon the attenuation of the x-ray beam by the object. Each detector element of the array produces a separate electrical signal that is a measurement of the beam attenuation at the detector location. The attenuation measurements from all the detectors are acquired separately to produce a transmission profile.

In known third generation CT systems, the x-ray source and the detector array are rotated with a gantry within the imaging plane and around the object to be imaged so that the angle at which the x-ray beam intersects the object constantly changes. X-ray sources typically include x-ray tubes, which emit the x-ray beam at a focal spot. X-ray detectors typically include a collimator for collimating x-ray beams received at the detector, a scintillator adjacent the collimator, and photodiodes adjacent the scintillator.

Multislice CT systems are used to obtain data for an increased number of slices during a scan. Known multislice systems typically include detectors generally known as 3-D detectors. With such 3-D detectors, a plurality of detector cells form separate channels arranged in columns and rows.

A scintillator for a 3-D detector may have scintillator elements with dimension of about 1×2×3 mm, with narrow gaps of only a few mils, for example, approximately 0.004 inches, between adjacent elements. As a result of the small size and the close proximity of the elements various problems arise. For example, a signal which impinges upon one scintillator element may be improperly reflected upward or to adjacent elements causing a loss of resolution.

Scintillators typically are cut using accurate dicing saws by-etching, or by laser cuting. Such cutting is necessary to provide the desired dimensions. The most common way to cut scintillators is with the outside diameter (OD) of a diamond saw. An OD saw has a diamond coating on the outside periphery of the blade to cut materials, such as ceramics. To maintain blade rigidity for accurate cuts, very high speeds are used, e.g., from 10,000 to 30,000 rpm. Cutting gaps, for example, a 4 mil gap, in a ceramic scintillator, however can be difficult if the aspect ratio of the gap is greater than about 10. Particularly, OD saws often produce inaccurate cuts for scintillators with aspect ratios greater than 10. Additionally, if only one scintillator is cut at a time, many handling operations are required for each three dimensional array. These methods are time consuming and expensive.

It would be desirable to provide a method for increasing cutting accuracy of scintillators for a 3-D detector. It would also be desirable to provide such a method that minimizes the number of handling operations required to create the scintillators.

SUMMARY OF THE INVENTION

These and other objects may be attained by a method of fabricating scintillators which includes the step of accurately cutting many ceramic scintillators at one time. Using the present method, ceramic scintillators may be cut at fairly fast speeds even if the scintillators are several inches thick and have aspect ratios greater than 10. More particularly, and in one embodiment, the scintillator elements are cut using an inside diameter (ID) saw. The ID saw has a blade having an inner circumference cutting edge with a diamond coating. Because the outer surface of the blade can be tensioned to a high stress, the blade is much more rigid than an OD blade. This tension enables accurate cuts even if the blade is making very deep cuts.

In one specific embodiment, a stack of scintillators is cut in a first direction with the ID diamond saw to create first bar stacks. After separating the first bar stacks into individual first bars, the first bars are mounted in a fixture with 4 mil gaps between the bars. After filling the gaps with a cast reflector material, the cast first bars are cut with the ID saw blade inner circumference cutting edge in a 90 degree direction relative to the first cut to form second bar stacks. After separating the second bar stacks into second bars, the second bars are then placed in a fixture with gaps between the second bars, a cast reflector material is placed in the gaps, and the bars are ground to final dimensions as a finished array.

The above-described method facilitates fabrication of scintillators with increased accuracy. In addition, cutting and casting several larger pieces of scintillation material minimizes the handling of small pixels or small arrays, therefore saving time.

DETAILED DESCRIPTION

Figure 1:
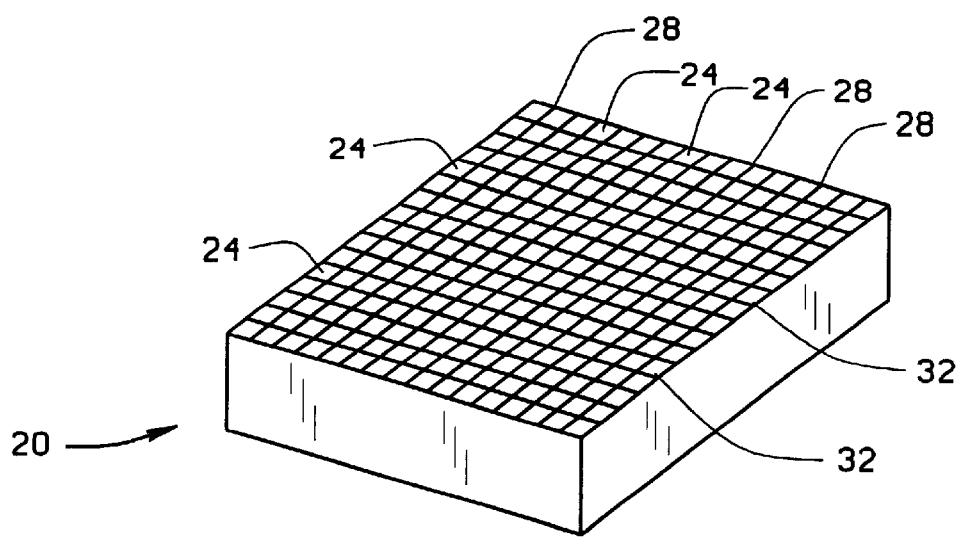
FIG. 1 is a perspective view of a scintillator having a plurality of scintillator elements.

FIG. 1 is a perspective view of a scintillator 20 including a plurality of scintillator elements 24 which are laid out in an array having first gaps 28 and second gaps 32. Scintillator elements 24 are processed from polycrystalline ceramic scintillators or single crystal scintillation material. Scintillator elements 24 produce a light output signal when impinged upon by a X-ray beam. The light output is optically coupled to a photodiode array. Each photodiode in the array produces a separate attenuation signal and the signals from all the photodiodes are separately acquired to produce a transmission profile.

Figure 2:
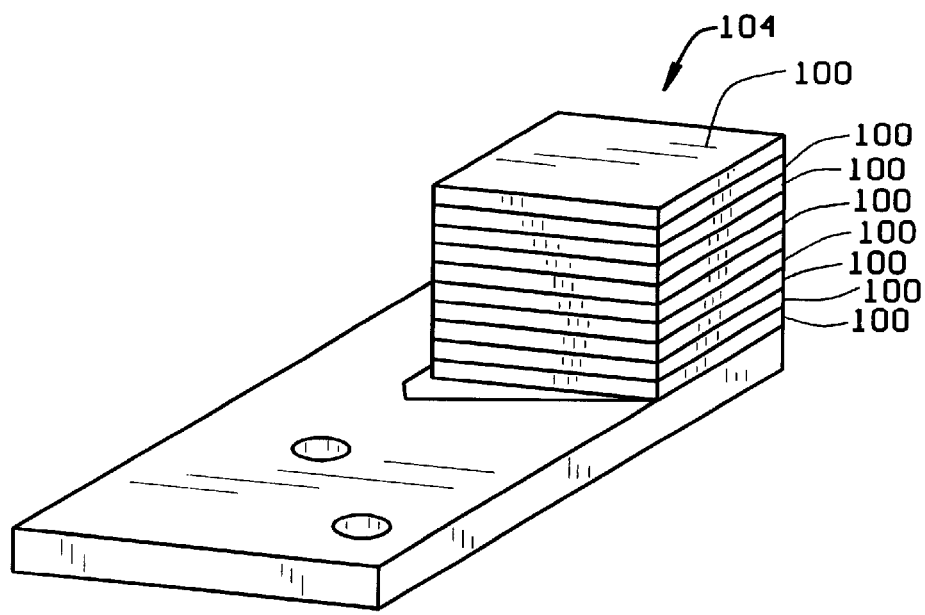
FIG. 2 is a perspective view of a stack of scintillator wafers.
Figure 3:
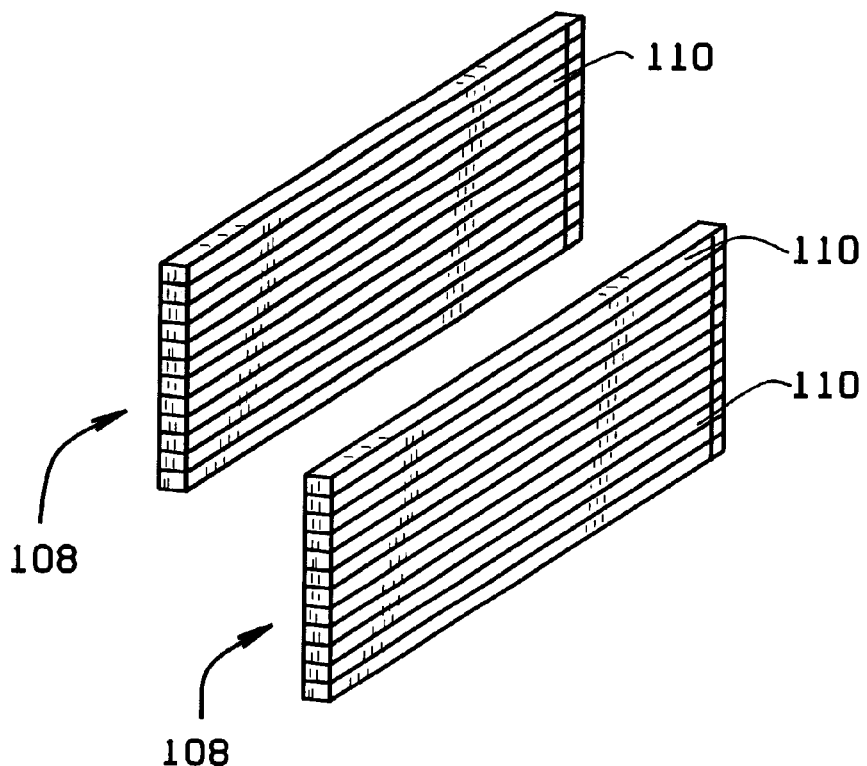
FIG. 3 is a perspective view of a bar stack of the wafer shown in FIG. 2.

In fabricating scintillator 20, and referring to FIGS. 2 and 3, scintillator wafers 100 are temporally bonded together using a low melting point adhesive, dissolvable adhesive, or other temporary adhesive (not shown) to form a stack 104. Stack 104 is cut into first bar stacks 108 using an inner circumference cutting edge of an inner diameter (ID) saw blade (not shown). ID saws are well known in the art. Until now, however, such ID saws were not used in fabricating scintillators. The ID saw blade is able to cut stack 104 more accurately than OD saw blades because the blade is tensioned on the outside diameter to a high stress making the blade much more rigid. After cutting, the temporary adhesive bond is broken and first bar stacks 108 are separated into first bars 110.

Figure 4:
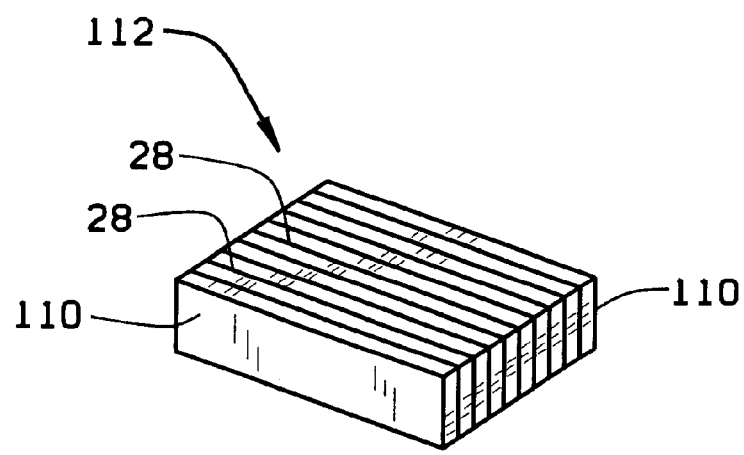
FIG. 4 is a perspective view of the first bars of the wafer shown in FIG. 3 after separation.
Figure 5:
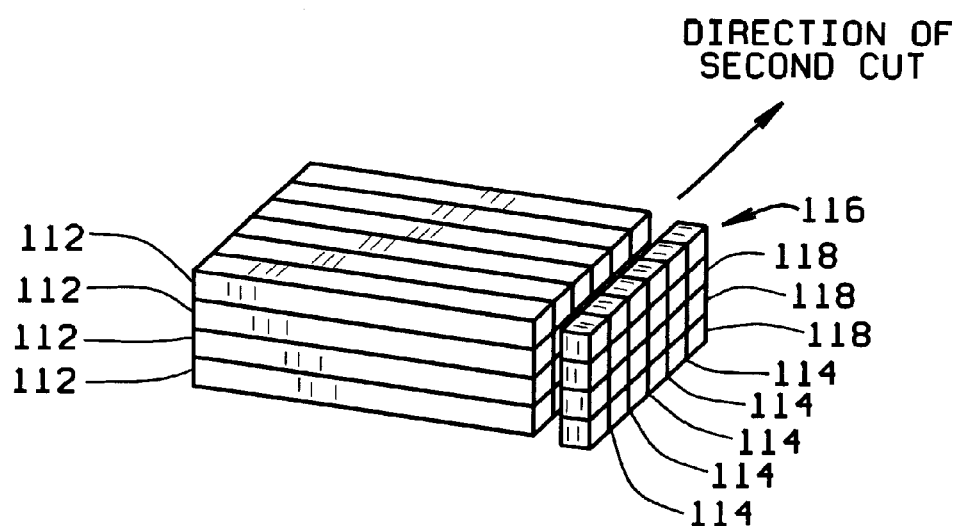
FIG. 5 is a perspective view of a stack of arrays.

Referring to FIGS. 4 and 5, first bars 110 are arranged in an array 112 and mounted on a fixture (not shown) so that first bars 110 are spaced apart from each other to form first gaps 28. Gaps 28, typically, range in width from 0.5 mils to 6 mils. In one embodiment, gaps 28 are about 4 mils wide and have a height/width aspect ratio of up to 30. Gaps 28 are then filled with a cast reflector material 114, for example, titanium dioxide (TiO2) and a castable polymer. After curing, a plurality of arrays 112 are stacked and then cut, using the ID saw inner circumference cutting edge, perpendicular to the first cut to create second bar stacks 116. Second bar stacks 116 are then separated into second bars 118. Second bars 118 are arranged in an array and mounted in a fixture (not shown) so that second bars 118 are spaced apart from each other forming second gaps 32. In one embodiment, gaps 32 are equal in width to gaps 28.

Figure 6:
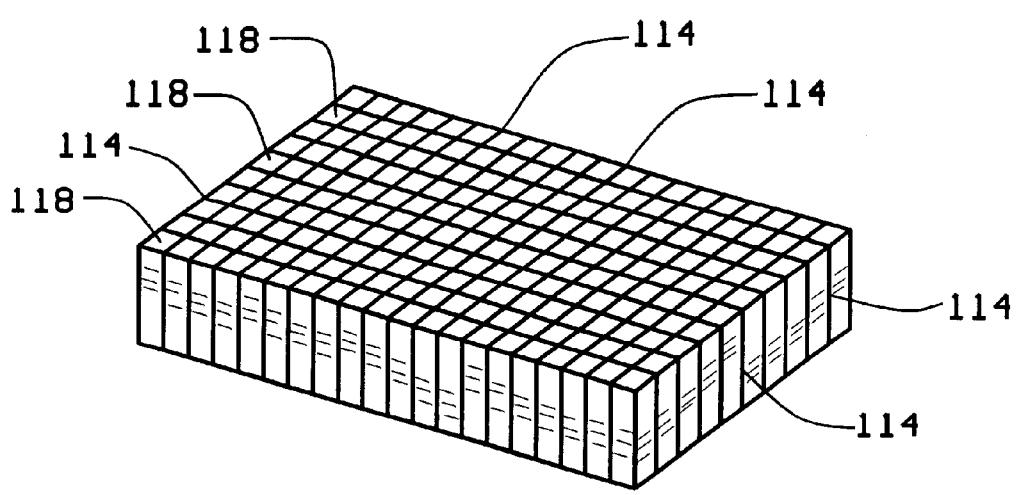
FIG. 6 is a perspective view of an array prior to final casting.

Referring to FIG. 6, gaps 32 are then filled with cast reflector material 114 similar to the material used to fill gaps 28. After curing, the array is separated from the fixture and reflective material 114 is cast around the periphery of the array. After a final grinding, a finished scintillator 20 having elements 24 with dimensions of about 1×2×3 mm is completed. In alternative embodiments, the size of the elements vary from those described above.

In another alternative embodiment, a scintillator (not shown) is fabricated similar to scintillator 20, however, first bar stacks are not separated into first bars 110. The first bar stacks are, instead, arranged in an array and mounted on a fixture so that the first bar stacks are spaced apart from each other to form first gaps. The first gaps are similar to gaps 28 and are filled with a cast reflector material similar to material 114. After curing, the first bar stacks are cut, using the ID saw inner circumference cutting edge, perpendicular to the first cut to create second bar stacks. The second bar stacks are then arranged in an array and mounted in a fixture (not shown) so that the second bar stacks are spaced apart from each other forming second gaps, similar to second gaps 32.

The second gaps are then filled with cast reflector material similar to the material used to fill the first gaps. After the material has cured, the array is separated from the fixture and a reflective material similar to material 114 is cast around the periphery of the array. The scintillator array is then cut using the cutting edge of the ID saw blade along the thickness of each wafer so that a plurality of scintillators are created from the scintillator array. After a final grinding, finished scintillators having elements with dimensions of about 1×2×3 mm are completed. In other alternative embodiments, the size of the elements vary from those described above.

The above-described method facilitates fabrication of three dimensional scintillators. In addition, the described method improves the positional accuracy of cutting the three dimensional scintillators, therefore saving time and reducing waste.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A method for fabricating scintillators for a computed tomograph system using an inner diameter saw, the inner diameter saw having a blade with an inner circumference cutting edge, said method comprising the steps of:

temporarily adhesively bonding a plurality of scintillators to form a stack, cutting the stack into a plurality of first bar stacks with the inside diameter saw cutting edge; and after said cutting, breaking the temporary adhesive bond and separating the first bar stacks into individual first bars.

2. A method in accordance with claim 1 wherein the scintillators are temporally bonded together using a low melting point adhesive.

3. A method in accordance with claim 1 wherein the scintillators are polycrystalline ceramic scintillators.

4. A method in accordance with claim 1 wherein the scintillators are single crystal scintillators.

5. A method in accordance with claim 1 further comprising the steps of:

placing the first bars in a fixture spaced by gaps;

bonding the first bars into a first bar array; and casting a reflector material on the first bar surfaces and into the gaps.

6. A method in accordance with claim 5 wherein cutting the first bars into a desired size array comprises the steps of:

cutting the first bar array into a plurality of second bars with the inside diameter saw cutting edge;

placing the second bars in a fixture spaced by second gaps; and casting a reflector material on the second bar surfaces and into the second gaps.

7. A method in accordance with claim 5 wherein cutting the first bars into a desired size array comprises the steps of:

placing a plurality of first bar arrays into a second stack;

cutting the second stack into a plurality of second bar stacks with the inside diameter saw cutting edge;

separating the second bar stacks into a plurality of second bars;

placing the second bars in a fixture spaced by second gaps; and casting a reflector material on the second bar surfaces and into the second gaps.

8. A method in accordance with claim 5 wherein the desired size array has scintillator elements having dimensions of X by Y by Z, where X is about 1 mm, Y is about 3 mm, and Z is about 2 mm.

9. A method in accordance with claim 1 further comprising the steps of:

placing the first bar stacks into a fixture;

spacing the first bar stacks in an array; and casting a reflector material on surfaces of the first bar stacks.

10. A method in accordance with claim 9 wherein spacing the bars in an array creates a plurality of gaps.

11. A method in accordance with claim 10 wherein the gap has a thickness in a range of between about 0.5 and 6 mils.

\* \* \* \* \*